(12) United States Patent
Terzani et al.

(10) Patent No.: US 11,601,858 B2
(45) Date of Patent: Mar. 7, 2023

(54) RELOCATION OF A USER EQUIPMENT CONNECTION FROM A SOURCE RADIO NETWORK CONTROLLER RNC TO A TARGET RNC INITIATED VIA A CORE NETWORK

(71) Applicant: Telefonaktiebolaget LM Ericsson (publ), Stockholm (SE)

(72) Inventors: Alessio Terzani, Stockholm (SE); Carin Omurcali, Solna (SE); Maria Hultström, Stockholm (SE); Ulrik Wahlberg, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 50 days.

(21) Appl. No.: 17/268,833

(22) PCT Filed: Sep. 3, 2018

(86) PCT No.: PCT/SE2018/050884
§ 371 (c)(1),
(2) Date: Feb. 16, 2021

(87) PCT Pub. No.: WO2020/050754
PCT Pub. Date: Mar. 12, 2020

(65) Prior Publication Data
US 2021/0235348 A1 Jul. 29, 2021

(51) Int. Cl.
*H04W 36/10* (2009.01)
*H04W 36/00* (2009.01)
*H04W 36/38* (2009.01)

(52) U.S. Cl.
CPC ....... *H04W 36/10* (2013.01); *H04W 36/0016* (2013.01); *H04W 36/0072* (2013.01); *H04W 36/00837* (2018.08); *H04W 36/38* (2013.01)

(58) Field of Classification Search
CPC ............. H04W 36/10; H04W 36/0016; H04W 36/00837; H04W 36/38
See application file for complete search history.

(56) References Cited

U.S. PATENT DOCUMENTS

2002/0151304 A1* 10/2002 Hogan ................. H04W 36/10
455/445
2003/0003919 A1 1/2003 Beming et al.
(Continued)

FOREIGN PATENT DOCUMENTS

| EP | 2793509 A1 | 10/2014 |
| WO | 2004089019 A1 | 10/2004 |
| WO | 2011019832 A1 | 2/2011 |

OTHER PUBLICATIONS

"3GPP TR 25.931 V14.0.0", 3rd Generation Partnership Project; Technical Specification Group Radio Access Network; UTRAN functions, examples on signalling procedures (Release 14), Mar. 2017, pp. 1-130.
(Continued)

*Primary Examiner* — Kan Yuen
(74) *Attorney, Agent, or Firm* — Murphy, Bilak & Homiller, PLLC

(57) ABSTRACT

A method performed by a source Radio Network Controller (RNC) for handling a relocation of a User Equipment (UE) connection from the source RNC to a target RNC to serve the UE in an ongoing wireless communication is provided. An interface between the source RNC and the target RNC is available. When all radio links in the ongoing wireless communication are controlled by the target RNC and a triggering condition is fulfilled for relocation of the UE connection from the source RNC to the target RNC, the source RNC decides (202) to discontinue to use said interface. Then a core network is used for sending (204) to the target RNC, a triggering of the relocation procedure for
(Continued)

relocating the source RNC to the target RNC to serve the UE. A Radio Resource Control (RRC) configuration defined by the target RNC to be used after the relocation to the target RNC is then obtained (205) via the core network. The RRC configuration, defined by the target RNC, is sent (206) to the UE enabling the UE to switch from an RRC configuration defined by the source RNC to the RRC configuration defined by the target RNC.

13 Claims, 12 Drawing Sheets

(56) References Cited

U.S. PATENT DOCUMENTS

| | | | |
|---|---|---|---|
| 2006/0035645 A1 | 2/2006 | Kim | |
| 2009/0175240 A1* | 7/2009 | Hayashi | H04W 36/08 370/331 |
| 2009/0233603 A1* | 9/2009 | Shim | 455/436 |
| 2010/0093351 A1* | 4/2010 | Barrett | H04W 36/0083 455/436 |
| 2015/0119038 A1* | 4/2015 | Kanamarlapudi | H04W 36/08 455/436 |

OTHER PUBLICATIONS

"3GPP TS 25.413 V14.1.0", 3rd Generation Partnership Project; Technical Specification Group Radio Access Network; LITRAN Iu interface Radio Access Network Application Part (RANAP) signalling (Release 14), Jun. 2017, pp. 1-456.

* cited by examiner

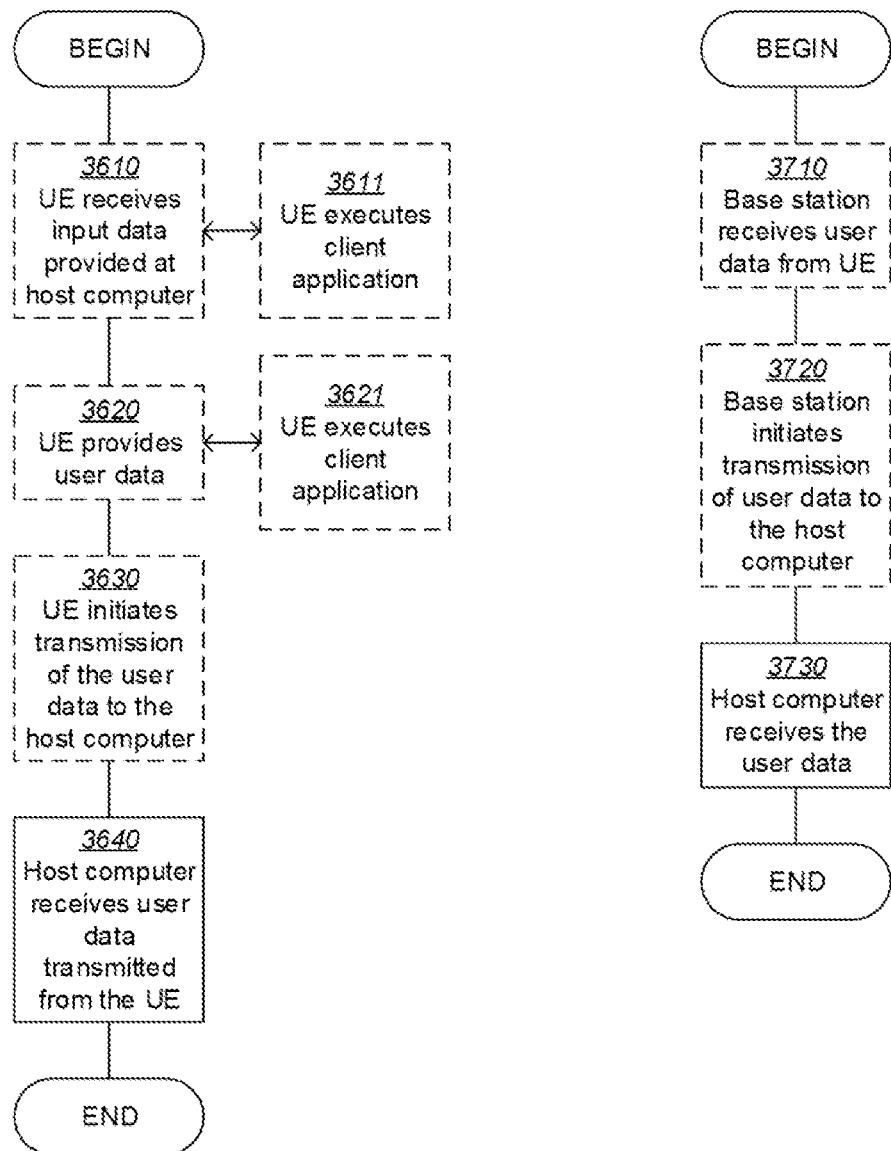

RELOCATION OF A USER EQUIPMENT CONNECTION FROM A SOURCE RADIO NETWORK CONTROLLER RNC TO A TARGET RNC INITIATED VIA A CORE NETWORK

TECHNICAL FIELD

Embodiments herein relate to a serving Radio Network Controller (RNC), a target RNC a User Equipment (UE) and methods therein. In some aspects, they relate to handling a relocation of a UE connection from the source RNC to the target RNC to serve the UE in an ongoing wireless communication.

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Two standardized relocation procedures for handling UE mobility between RNCs in Wideband Code Division Multiple Access (WCDMA) networks are: Serving Radio Network Subsystem (SRNS) Relocation UE involved and SRNS Relocation UE not involved as described by respective 3GPP TS 25.931 and TS 25.413. When a UE in a Dedicated Channel (DCH) state moves from a source RNC to a target RNC, these following relocation procedures may be used:

SRNS Relocation UE Involved

This procedure is applied when an IUR interface between a source RNC and a target RNC is not available. This may be the case when there is no physical connection between the source RNC and the target RNC. This is typically the case when the RNCs belong to different network vendors. Based on radio signal quality measurements reported by the UE, the source RNC makes the decision to perform a hard handover to the target RNC via a core network (CN), since the IUR interface is not available. A hard handover is when a new radio link towards the UE is setup and the UE stops transmitting and receiving data on the old radio link and instead uses the new one. The new and old radio links are not used simultaneously. The source RNC decides into which RNC the source RNC functionality shall be relocated. The UE receives a Radio Resource Control (RRC) message ordering it to perform the handover to the target RNC, from the source RNC. The RRC configuration is defined by the target RNC.

SRNS Relocation UE not Involved

This procedure is applied when the IUR interface between the source RNC and the target RNC is available. This relocation procedure may be performed when all the UE radio links are in the target RNC, but the source RNC still controls the UE through the IUR interface. The source RNC makes the decision to perform a relocation procedure to move the context, i.e. to move all parameters used for the connection in the source RNC to the target RNC via the IUR interface. The UE is not involved in the relocation procedure because all the radio links are already moved to the target RNC and there is no need to notify the UE about the change of RNC.

The two relocation procedures SRNS Relocation UE involved and SRNS Relocation UE not involved have the following drawbacks:

SRNS Relocation UE Involved

Depending on the border between the source RNC and the target RNC and on the UE behaviour, i.e. if the UE is stationary or moving, after having performed the hard handover to the target RNC, there is a risk that the UE immediately moves back to the previous source RNC. This causes a ping-pong effect when the UE is moving back and forth between the previous source RNC and the target RNC. Consequently, there may be a risk of degrading the user experience of the UE due to speech gaps and/or slow packet switch (PS) connection. This is mainly experienced by UEs that are stationary close to an RNC border.

The ping-pong effect may be mitigated by tuning specific parameters, such as creating a hysteresis on a UE measured radio signal quality from the target RNC, but it requires extra configuration work by operators and may cause radio performance degradation. This means lower throughput and the risk of unintended call release.

SRNS Relocation UE not Involved

A problem which may be related with this procedure mainly happens in case the source RNC and the target RNC belong to different vendors, such as operators. When this procedure is executed, the target RNC inherits the context from the serving RNC. The context comprises configurations and parameter settings of Radio Access Bearers (RABs), transport channels and physical channels used by several functionalities. Since each vendor uses its own configuration based on supported features, proprietary algorithms and simulations, the parameter settings received by the target RNC might be non-optimized or incompatible. This might cause dropped calls, which is when the call is abruptly released by the radio network, or non-optimized resources usage.

SUMMARY

An object of embodiments herein is to improve the handling of relocation for a UE between a source RNC and a target RNC in a wireless communication network.

According to an aspect of embodiments herein, the object is achieved by a method performed by a source RNC for handling a relocation of a UE connection from the source RNC to a target RNC to serve the UE in an ongoing wireless communication. An interface between the source RNC and the target RNC is available. When all radio links in the ongoing wireless communication are controlled by the target RNC and a triggering condition is fulfilled for relocation of the UE connection from the source RNC to the target RNC the source RNC decides to discontinue to use said interface. Then the source RNC uses a core network to send to the target RNC, a triggering of the relocation procedure for relocating the source RNC to the target RNC to serve the UE. A Radio Resource Control, RRC, configuration defined by the target RNC to be used after the relocation to the target RNC is then obtained by the source RNC via the core network. The source RNC sends the RRC configuration defined by the target RNC to the UE. This enables the UE to switch from an RRC configuration defined by the source RNC to the RRC configuration defined by the target RNC.

According to another aspect of embodiments herein, the object is achieved by a method performed by a target RNC for handling a relocation of a source RNC to the target RNC to serve a UE in an ongoing wireless communication. An interface between the source RNC and the target RNC is available. When decided that the UE is at a distance, from a border between the source RNC and the target RNC that is below a threshold value, an order to establish at least one radio link to be controlled by the target RNC for the ongoing wireless communication is received from the source RNC via the interface between the source RNC and the target RNC. At least one radio link for the ongoing wireless communication is established according to the order. When all radio links in the ongoing wireless communication are controlled by the target RNC and a triggering condition is fulfilled for relocation of the UE connection from the source RNC to the target RNC, and when decided to discontinue to use said interface, a triggering of a relocation procedure for relocating the source RNC to the target RNC to serve the UE is received from the source RNC via a core network. Thereafter a RRC configuration to be used after the relocation to the target RNC is created. The RRC configuration defined by the target RNC is then sent to the UE via the source RNC using a core network to enable the UE to switch from an RRC configuration, defined by the source RNC, to the RRC configuration defined by the target RNC.

According to another aspect of embodiments herein, the object is achieved by a source RNC for handling a relocation of a UE connection from the source RNC to a target RNC to serve the UE in an ongoing wireless communication. An interface between the source RNC and the target RNC is adapted to be available. The source RNC is configured to:

When all radio links in the ongoing wireless communication are controlled by the target RNC and a triggering condition is fulfilled for relocation of the UE connection from the source RNC to the target RNC, decide to discontinue to use said interface.

Use a core network to send to the target RNC, a triggering of the relocation procedure for relocating the source RNC to the target RNC to serve the UE.

Obtain from the target RNC via the core network a Radio Resource Control, RRC, configuration adapted to be defined by the target RNC to be used after the relocation to the target RNC.

Send the RRC configuration defined by the target RNC to the UE, enabling the UE to switch from an RRC configuration defined by the source RNC to the RRC configuration defined by the target RNC.

According to another aspect of embodiments herein, the object is achieved by a target RNC for handling a relocation of a UE connection of a source RNC to the target RNC to serve a UE in an ongoing wireless communication. An interface between the source RNC and the target RNC is adapted to be available. The target RNC is configured to:

When the UE is at a distance, from a border between the source RNC and the target RNC, that is below a threshold value, receive from the source RNC via the interface between the source RNC and the target RNC, an order to establish at least one radio link to be controlled by the target RNC (112) for the ongoing wireless communication.

Establish at least one radio link for the ongoing wireless communication, according to the order.

When all radio links in the ongoing wireless communication are controlled by the target RNC and a triggering condition is fulfilled for relocation of the UE connection from the source RNC to the target RNC, and when decided to discontinue to use said interface, receive from the source RNC, via a core network, a triggering of a relocation procedure for relocating the source RNC to the target RNC to serve the UE.

Create a Radio Resource Control, RRC, configuration to be used after the relocation to the target RNC.

Using a core network to send the RRC configuration adapted to be defined by the target RNC to the UE via the source RNC, enabling the UE to switch from an RRC configuration, adapted to be defined by the source RNC, to the RRC configuration adapted to be defined by the target RNC.

By avoiding using the interface even when available it is possible to impose on the benefits and mitigate the drawbacks of the existing relocation procedures. Thus, even when the interface is available, a core network is used to relocate the UE. The interface, such as an IUR interface, is used to relocate the UE when the UE is close enough to a border between the source RNC and the target RNC. A Radio Resource Control, RRC, configuration defined by the target RNC to be used after the relocation to the target RNC is then obtained via the core network. The RRC configuration, defined by the target RNC, is sent to the UE enabling the UE to switch from an RRC configuration defined by the source RNC to the RRC configuration defined by the target RNC.

This results in better interworking between vendors as the need for agreed configurations used in inter-vendor scenarios are reduced and as it reduces the risk of incompatible or non-optimized configurations in case of inter-vendor RNCs. This also results in improved user experience mainly for stationary and slow moving UEs since the ping-pong effect when the UE is moving back and forth between the source RNC and the target RNC may be avoided. In this way, the handling of relocation for the UE between the source RNC and the target RNC in the wireless communication network is improved Another advantage of embodiments herein is that soft handover gain is maintained in the RNC border area, i.e. the border between the source RNC and the target RNC. This is beneficial because the UE can transmit and receive data from more than one radio link belonging to different RNC increasing the redundancy and, at the same time, reducing the interference level in the network.

A further advantage of embodiments herein is that hard handover is only applicable to UEs that no longer have any radio link in the Serving RNC. This is beneficial because the control of the connection is moved to the RNC where the UE is, which gives the RNC a better handling of the connection.

BRIEF DESCRIPTION OF THE FIGURES

FIGS. 11-14 are flowcharts illustrating methods implemented in a communication system including a host computer, a base station and a user equipment.

DETAILED DESCRIPTION

The embodiments herein are based on the insight that by joining the benefits and alleviating the drawbacks of the existing relocation procedures in combining the use of an interface with hard handover using a core network, a surprisingly improved user experience and unexpectedly better interworking between vendors may be achieved. The embodiments herein thus provide an improved option for mobility between different WCDMA Radio Network Subsystems (RNSs). Embodiments herein use an interface, such as an IUR interface, and also uses the relocation procedure SRNS Relocation UE involved, i.e. hard handover via a core network, when a UE is moving between different RNSs.

The interface, such as the IUR interface, may be used for UEs close to the RNS border, i.e. the border between a source RNC and a target RNC.

When the UE connection has no radio links controlled by the source RNC and a trigger condition is fulfilled, the source RNC initiates the relocation procedure SRNS Relocation UE involved to the target RNC. Thereby the surprisingly improved user experience and unexpectedly better interworking between vendors is achieved.

The embodiments herein are applicable both to Circuit Switched (CS) and Packet Switched (PS) connections.

Figure 1:
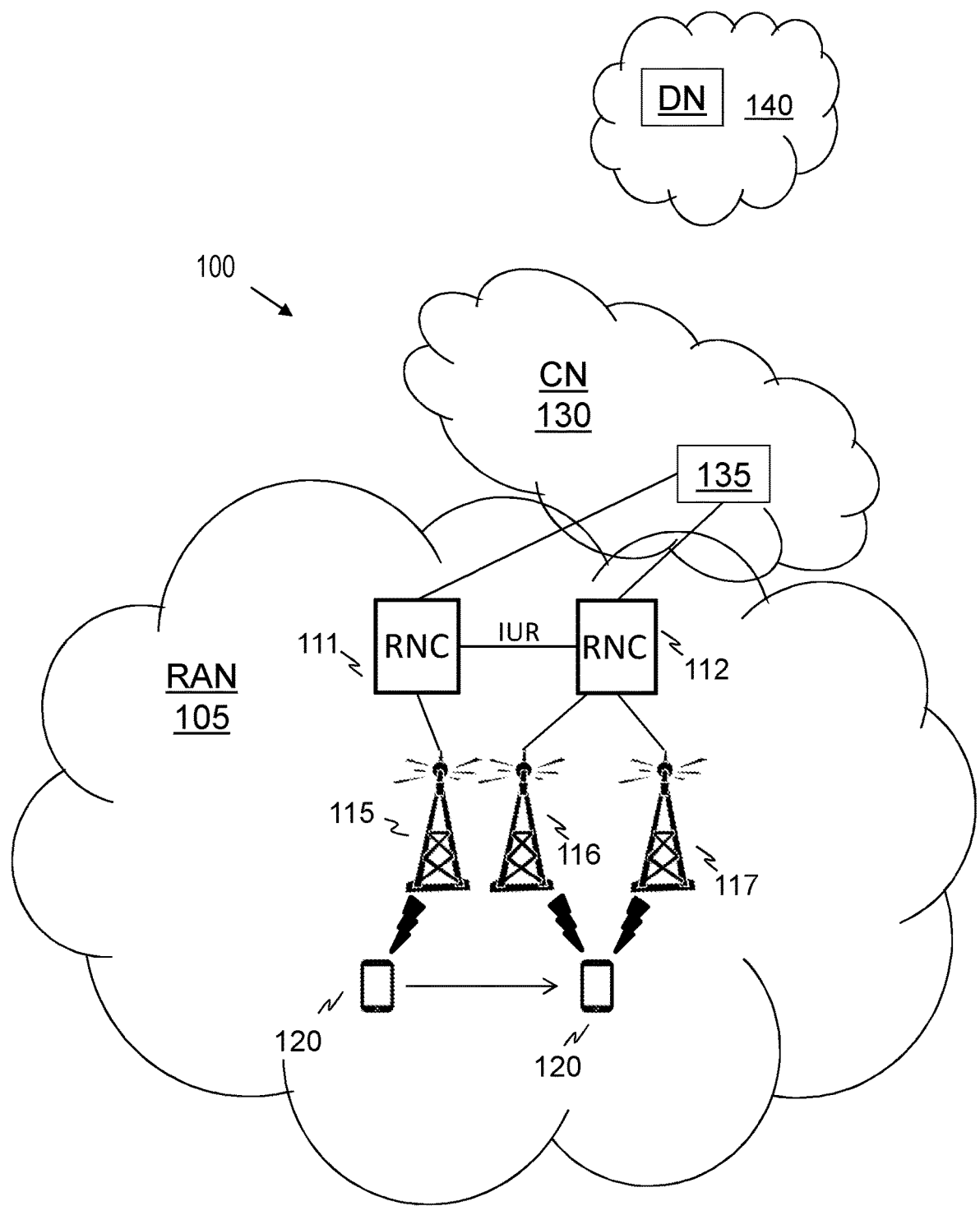
FIG. 1 is a schematic block diagram illustrating embodiments of a wireless communications network.

Embodiments herein relate to wireless communication networks in general. FIG. 1 is a schematic overview depicting a wireless communications network 100 in which embodiments herein may be implemented. The radio communications network 100 comprises one or more RANs 105 and one or more CNs 130. The radio communications network 100 uses Wideband Code Division Multiple Access (WCDMA) in all examples herein but may also use a number of other technologies, such as NB-IoT, CAT-M, Wi-Fi, eMTC, Long Term Evolution (LTE), LTE-Advanced, 5G, New Radio (NR), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Radio Network Controllers (RNCs), such as an RNC 111 and an RNC 112, operate in the radio communications network 100. The main function of the RNC is to control and manage the RAN and the radio channels. In a relocation process according to embodiments herein relocation is performed from the RNC 111 to the RNC 112, therefore these RNCs are referred to as the source RNC 111 and the target RNC 112. The RNCs 111, 112 may communicate with each other via an interface such as an IUR interface. The RNCs 111, 112 may further communicate with each other via the CN 130 such as e.g. via a CN node 135.

The RNCs 111, 112 serve one or more network nodes operating in the radio communications network 100, such as e.g. the source RNC 111 may serve a network node 115, and a network node 116, and the target RNC 112 may serve a network node 117. The respective network nodes 115, 116, 117 provides radio coverage over a geographical area, which may also be referred to as a cell, a beam or a beam group of the same or different a Radio Access Technology (RAT), such as 5G, LTE, NB-IoT, CAT-M, Wi-Fi, eMTC or similar. The respective network node 115, 116, 117 may e.g. be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a UE within the radio coverage area served by the respective network node 115, 116, 117 depending e.g. on the radio access technology and terminology used. The respective network node 115, 116, 117 may communicate with a UE with Downlink (DL) transmissions to the UE and Uplink (UL) transmissions from the UE.

In the wireless communication network 100, UEs such as a UE 120 operate. The UE 120 may e.g. be a mobile station, a non-access point (non-AP) STA, a STA, a user equipment and/or a wireless terminals, an NB-IoT device, an eMTC device and a CAT-M device, a WiFi device, an LTE device and an NR device communicate via one or more Access Networks (AN), e.g. RAN, to one or more core networks (CN). It should be understood by the skilled in the art that "UE" is a non-limiting term which means any terminal, wireless communication terminal, wireless device, Device to Device (D2D) terminal, or node e.g. smart phone, laptop, mobile phone, sensor, relay, mobile tablets or even a small base station communicating within a cell.

According to an example scenario herein, the UE 120 being served by the source RNC 111 moves towards the target RNC 112. This is pointed out with an arrow in FIG. 1.

Methods according to embodiments herein may be performed by any of the RNCs 111, 112. As an alternative, a Distributed Node (DN) and functionality, e.g. comprised in a cloud 140 as shown in FIG. 1 may be used for performing or partly performing the methods.

An interface between the serving RNC 111 and the target RNC 112, which may be an IUR interface, is used for UEs such as the 120 close to the border between the source RNC 111 and the target RNC 112. According to example embodiments herein, when the UE 120 connection has no radio links controlled by the source RNC 111 anymore, it initiates a relocation procedure via the core network 130 instead of using the interface between the source RNC 111 and the target RNC 112. A new configuration that is defined by the target RNC 112 is sent to the UE 120 which avoids dropped calls, which is when the call is abruptly released by the radio network, or non-optimized resources usage. The embodiments herein are applicable to both Circuit Switched (CS) connections and Packet Switched (PS) connections.

Figure 2:
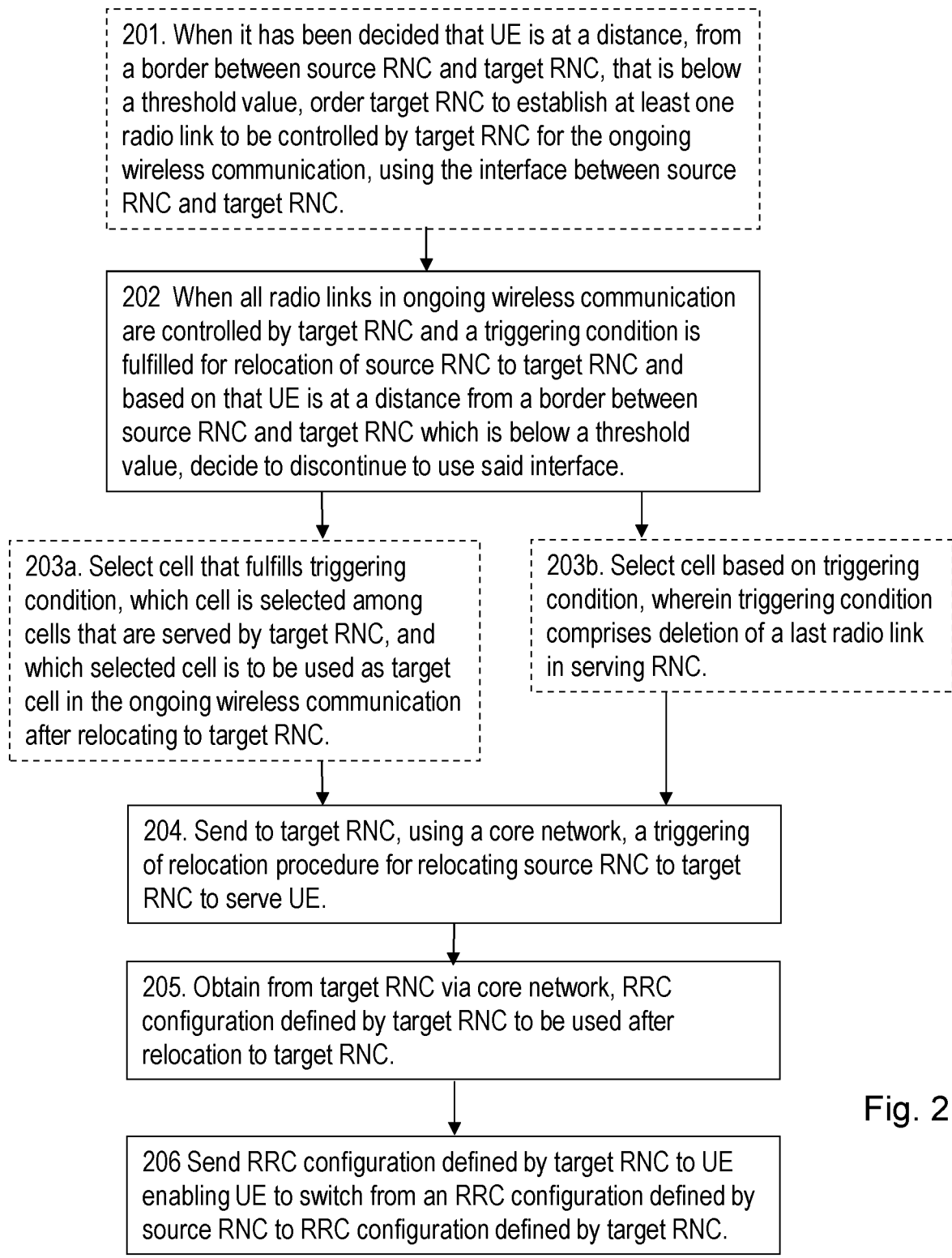
FIG. 2 is a flowchart depicting embodiments of a method in a source RNC.

Example embodiments of a method performed by the source RNC 111 for handling a relocation of the UE 120 connection from the source RNC 111 to the target RNC 112 to serve the UE 120 in an ongoing wireless communication will now be described with reference to a flowchart depicted in FIG. 2. The source RNC 111, the target RNC 112 and the UE 120 operate in a wireless communication network 100. An interface, such as e.g. an IUR interface, between the source RNC 111 and the target RNC 112 is available.

According to an example scenario, radio links are controlled by the source RNC 111 which is serving the UE 120 in the ongoing communication. When the UE 120 moves towards the target RNC 112, the radio links will gradually be moved to be controlled by the target RNC 112, and finally relocation of the UE connection from the source RNC to the target RNC to serve the UE 120 will be needed. According to some embodiments herein the relocation is a Serving Radio Network Subsystem, SRNS, relocation.

The method may comprise the following actions which actions may be taken in any suitable order. Actions that are optional are presented in dashed boxes in FIG. 2.

Action 201

When the UE 120 is close enough to the border between the source RNC 111 and the target RNC 112, the source RNC 111 will instruct the target RNC 112 via the interface to establish new radio links. The UE 120 being close enough to the border may mean that it is at a distance from the border that is below a threshold value. The threshold value may e.g. be a distance of up to 500 meters from the border, such as 10-300 meters, 50-200 meters or 80-120 meters. According to some embodiments herein, when it has been decided, e.g. by the source RNC 111 that the UE 120 is at a distance from the border, between the source RNC 111 and the target RNC 112, that is below a threshold value, then the source RNC 111 orders the target RNC 112 to establish at least one radio link to be controlled by the target RNC 112 for the ongoing wireless communication. The source RNC 111 sends the order by using the interface between the source RNC 111 and the target RNC 112.

Action 202

As mentioned above, the radio links will gradually move to be controlled by the target RNC 112 when the UE 120 moves from the source RNC to the target RNC 112, and finally relocation of the UE 120 connection from the source RNC 111 to the target RNC 112 to serve the UE 120 will be needed. Thus, according to embodiments herein, the source RNC 111 will not use the interface such as the IUR interface for communication in the relocation procedure, even if it is available. This is according to the 3GPP standard when SRNS Relocation UE involved may be used, which is the chosen method for the relocation procedure. Thus, when all radio links in the ongoing wireless communication are controlled by the target RNC 112 and a triggering condition is fulfilled for relocation of the UE 120 connection from the source RNC 111 to the target RNC 112, the source RNC 111 decides to discontinue using said interface.

Action 203a

In some embodiments, a new cell, provided by a network node such as the network node 117, served by the target RNC 112 may be chosen by the source RNC 111. This new cell will be the target cell for the UE 120 to be served in after the relocation.

According to some embodiments the triggering condition comprises a deletion of a last radio link in the serving RNC 111 followed by a received measuring report from the UE 120 when the cells that are served by the target RNC 112 enter a reporting range to the UE 120. Other triggering conditions may be related to timing, geographical location or radio signal strength.

According to some embodiments the source RNC 111 selects a cell that has entered a reporting range to the UE 120, according to the received measuring report from the UE 120. The cell is thus selected among any of the cells served by the target RNC 112 that fulfills the handover condition such as e.g. the new cell has been reported by the UE 120 as a better cell for handling the connection. The selected cell is to be used as a target cell in the ongoing wireless communication after relocating to the target RNC 112. This embodiment will be further described below.

Action 203b

In these alternative embodiments, it is instead the selection of the target cell that is changed, and the triggering condition does not require a new measuring report from the UE 120. According to some embodiments the source RNC 111 selects a cell is based on the triggering condition, and wherein the triggering condition comprises a deletion of a last radio link in the serving RNC 111. Other triggering conditions may be related to timing, geographical location or radio signal strength.

According to some embodiments the cell is selected among cells that are served by the target RNC 112 and further, that are active for the UE 120. A cell active for the UE 120 means that the UE 120 is already communicating via that cell. The best cell in the active set of cells may be used as target cell after the relocation to the target RNC 112. The selection of a cell according to this embodiment will further be described below.

Action 204

According to embodiments herein, instead of the interface, the core network 130 will be used for the communication in the relocation procedure. This is since the 3GPP standard mandates using the CN for SRNS Relocation UE involved, which may be the chosen method for the relocation procedure. Thus, the core network 130 is used by the source RNC 111 to send to the target RNC 112, a triggering of the relocation procedure for relocating the source RNC 111 to the target RNC 112 to serve the UE 120.

Action 205

According to embodiments herein the source RNC 111 obtains from the target RNC 112 via the core network 130, an RRC configuration defined by the target RNC 112 to be used after the relocation to the target RNC 112. This is an advantage since it is the target RNC 112 which decides what the configuration used by the UE after the relocation is, which allows for better connection handling.

Action 206

According to embodiments herein the source RNC 111 then sends the RRC configuration defined by the target RNC 112 to the UE 120. This enables the UE 120 to switch from an RRC configuration defined by the source RNC 111 to the RRC configuration defined by the target RNC 112.

A great advantage with the method described above is that the UE 120 connection may exploit the soft handover gain in the RNC border area and receive a new RNC specific configuration once the UE 120 radio links are controlled by one RNC, allowing a better connection handling.

Figure 3:
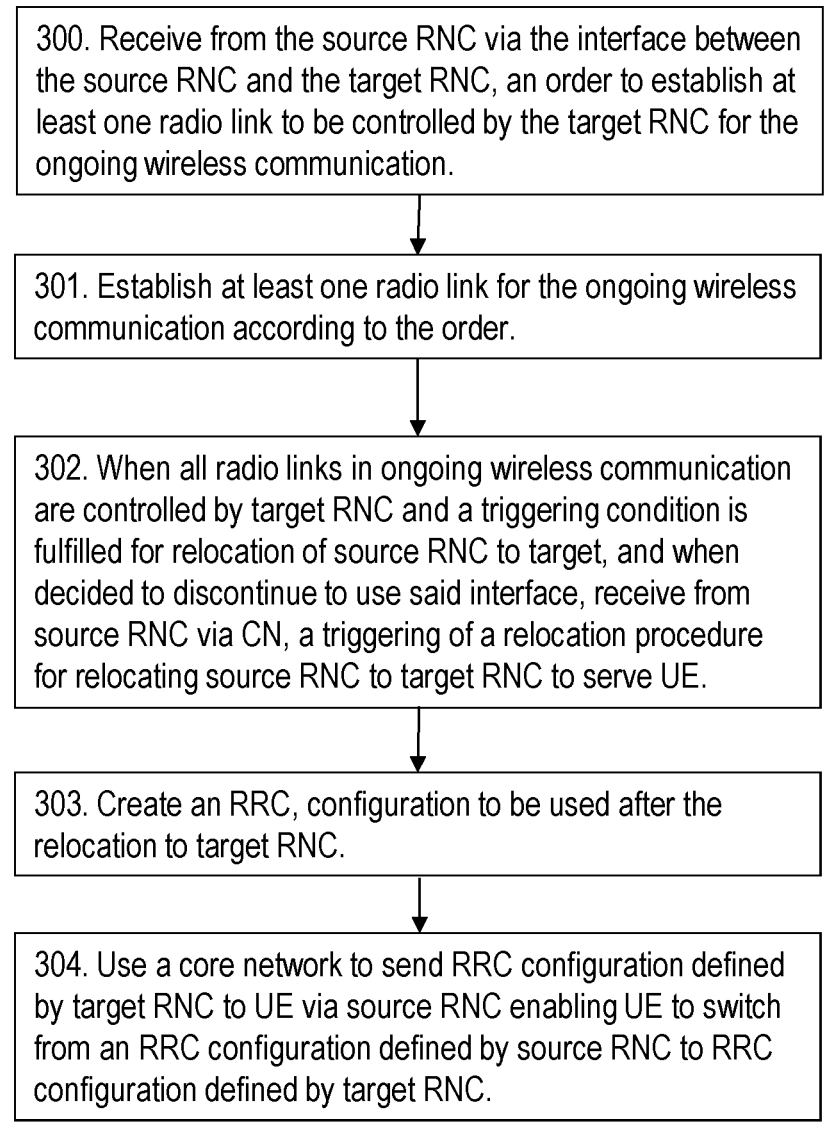
FIG. 3 is a flowchart depicting embodiments of a method in a target RNC.

Example embodiments of a method performed by the target RNC 112 for handling a relocation of a UE 120 connection from the source RNC 111 to the target RNC 112 to serve the UE 120 in an ongoing wireless communication will now be described with reference to a flowchart depicted in FIG. 3. As mentioned above, the source RNC 111, the target RNC 112 and the UE 120 operate in a wireless communication network 100. The interface such as the IUR interface, between the source RNC 111 and the target RNC 112 is available. The interface is used in the ongoing communication.

According to the example scenario mentioned above, radio links are controlled by the source RNC 111 which is serving the UE 120 in the ongoing communication. When the UE 120 moves towards the target RNC 112, the radio links will gradually be moved to be controlled by the target RNC 112, and finally relocation of the UE connection from the source RNC to the target RNC to serve the UE 120 will be needed. According to embodiments herein the relocation may be an SRNS relocation.

The method may comprise one or more of the following actions which actions may be taken in any suitable order. Actions that are optional are presented in dashed boxes in FIG. 3.

Action 300

According to embodiments herein when all radio links in the ongoing wireless communication are controlled by the target RNC and a triggering condition is fulfilled for relocation of the UE 120 connection from the source RNC to the target RNC (112), the target RNC 112 decides to discontinue to use said interface.

Action 301

According to embodiments herein the target RNC 112 establishes at least one radio link for the ongoing wireless communication, using the interface between the source RNC 111 and the target RNC 112, according to the order.

Action 302

According to embodiments herein when all radio links in the ongoing wireless communication are controlled by the target RNC 112 and a triggering condition is fulfilled for relocation of the UE 120 connection from the source RNC 111 to the target RNC 112, and when decided to discontinue to use said interface, the target RNC 112 receives from the source RNC 111 via the core network 130, a triggering of a relocation procedure for relocating the source RNC 111 to the target RNC 112 to serve the UE 120.

Action 303

According to embodiments herein the target RNC 112 then creates a Radio Resource Control, RRC, configuration to be used after the relocation to the target RNC 112.

Action 304

The target RNC 112 then uses the core network 130 to send the RRC configuration defined by the target RNC 112 to the UE 120 via the source RNC 111, enabling the UE 120 to switch from an RRC configuration, defined by the source RNC 111, to the RRC configuration defined by the target RNC 112.

Embodiments herein such as mentioned above will now be further described and exemplified. The text below is applicable to and may be combined with any suitable embodiment described above.

In the embodiments the interface, such as an IUR interface is used for ordering the target RNC 112 to establish radio links for UEs 120 close to the RNS border, i.e. the border between the source RNC 111 and the target RNC 112. When the UE 120 connection has no radio links any more that are controlled by the source RNC 111 the source RNC 111 initiates a relocation via the core network 130. This means that a new configuration defined by the target RNC 112 is sent by the source RNC 111 to the UE 120.

Figure 4:
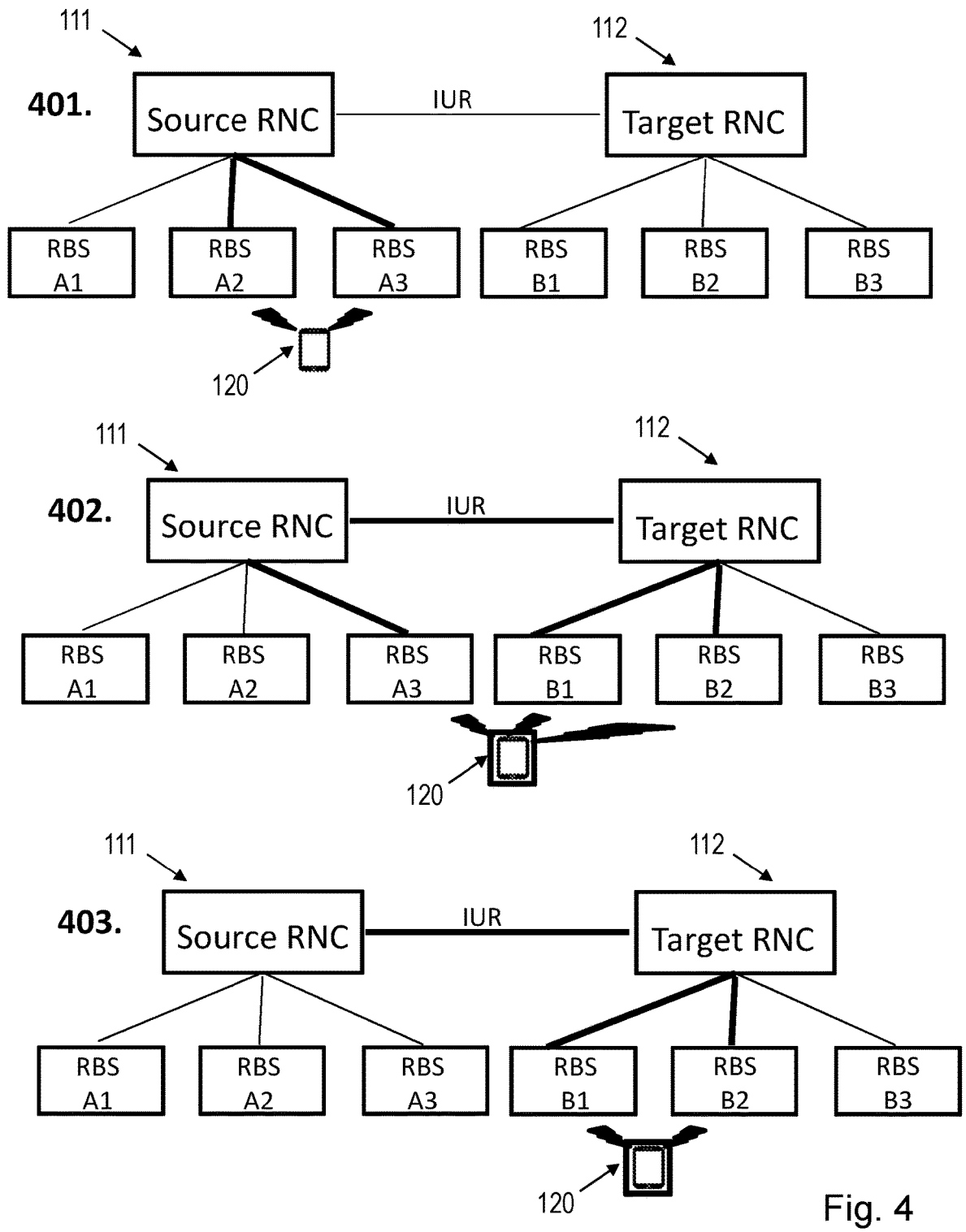
FIG. 4 is a schematic block diagram illustrating an example scenario of embodiments herein.

Embodiments herein involve mobility between two different RNCs, i.e. the UE 120 moves from being served by the source RNC 111 to be served by the target RNC 112. When a UE 120 in a Dedicated Channel (DCH) state is moving from the coverage of the source RNC 111 to the coverage of the target RNC 112 the embodiments herein may work in the following way as illustrated in the example scenarios 401, 402, and 403 in FIG. 4: A UE being in a DCH state means that the UE has been allocated dedicated channels to transmit and receive data. In FIG. 4, the source RNC 111 serves three Radio Base Stations (RBSs) referred to as A1, A2 and A3, and the target RNC 112 serves three RBSs referred to as B1, B2 and B3.

Scenario 401. First a UE connection is setup in a serving radio network subsystem (SRNC) in the communications network 100. The UE 120 is in DCH state and all radio links are controlled by the source RNC 111. Here two links are set up between the UE 120 and the RBS referred to as A2 and A3. These two links are marked as thicker lines in the figure.

Scenario 402. Then the UE 120 moves into the coverage of the target RNC 112. The source RNC 111 initiates soft handover and orders the target RNC 112 to setup new radio links using an interface, such as an IUR interface. Here two links are set up between the UE 120 and the RBS referred to as B1 and B2. There is still one link set up between the UE 120 and the RBS referred to as A3. These links are marked as thicker lines in the figure.

Scenario 403. Thereafter the UE 120 moves further away from the source RNC 111 until all radio links controlled by the source RNC 111 are deleted. Only radio links controlled by the target RNC 112 are in the active set, i.e. in the active cells where the UE 120 is transmitting and receiving data. The source RNC 111 is still in control of the UE 120 connection. Here two links are set up between the UE 120 and the RBS referred to as B1 and B2. No links are set up between the UE and the RBS referred to as A1, A2 and A3.

Figure 5A:
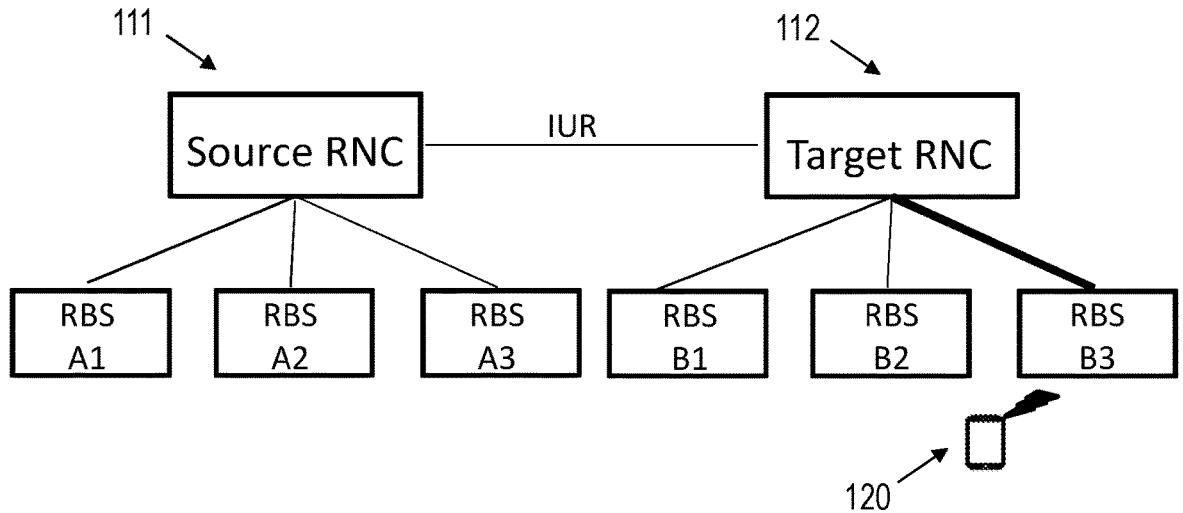
FIG. 5a is a schematic block diagram illustrating an example scenario of embodiments herein.
Figure 5B:
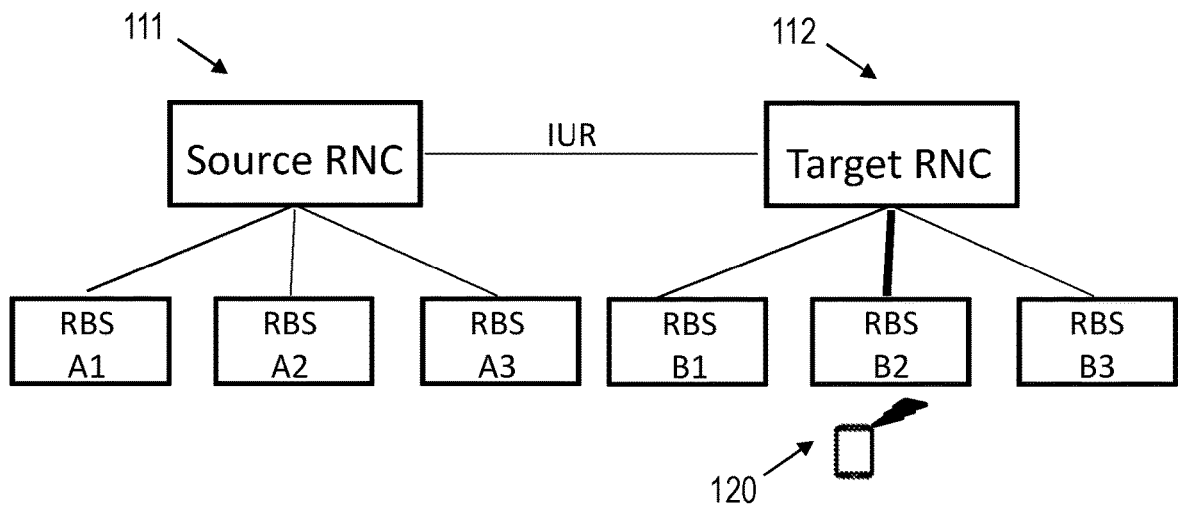
FIG. 5b is a schematic block diagram illustrating an example scenario of embodiments herein.

Two possible relocation procedures according to embodiments herein are shown in FIG. 5*a* and FIG. 5*b*.

In some embodiments as illustrated in FIG. 5*a*, once all radio links in the source RNC 111 are deleted the source RNC 111 waits for a trigger condition to be fulfilled. The trigger condition may be a next measurement report with an event 1*a*. Event 1*a* is when the cells that are served by the target RNC enter a reporting range to the UE.

The cell is chosen among all available cells, which may be network nodes such as base stations. The cell is chosen among the available cells that are fulfilling the trigger condition, and the chosen cell is then used as a target cell in the relocation procedure.

The source RNC 111 then triggers a relocation, via the core network 130, to the target RNC 112 defining the target cell.

The relocation procedure involves the UE 120 as the source RNC 111 is sending a new RRC reconfiguration defined by the target RNC 112 to the UE 120. The core network 130 is used to transfer the information between the source RNC 111 and the target RNC 112. The interface, which may be an IUR interface, is not used in the relocation procedure.

The UE 120 then switches from the old RRC configuration defined by the source RNC 111 to the new RRC configuration defined by the target RNC 112. This is a hard handover.

In FIG. 5*a*, the source RNC 111 serves three Radio Base Stations (RBSs) referred to as A1, A2 and A3, and the target RNC 112 serves three RBSs referred to as B1, B2 and B3. Here one link is set up between the UE 120 and the RBS referred to as B3. This link is marked as a thicker line in the figure.

In some alternative embodiments as illustrated in FIG. 5*b*, the trigger condition may be the deletion of last radio link in the source RNC 111. In FIG. 5*b*, the source RNC 111 serves three Radio Base Stations (RBSs) referred to as A1, A2 and A3, and the target RNC 112 serves three RBSs referred to as B1, B2 and B3. Here one link is set up between the UE 120 and the RBS referred to as B2. This link is marked as a thicker line in the figure.

The difference in these embodiments compared to the embodiments of FIG. 5*a* is that the source RNC 111 does not wait for a next measurement report with an event 1*a* to trigger the relocation, which results in a different way to select the target cell.

The best cell, measured and reported by the UE 120 and received at an earlier stage, from the active set of cells, i.e. the active cells where the UE 120 is transmitting and receiving data is used as a target cell in the relocation procedure.

Then the source RNC 111 triggers a relocation, via the core network 130 to the target RNC 112 defining the target cell.

The relocation procedure involves the UE 120 by the source RNC 111 sending a new RRC configuration defined by the target RNC 112 to the UE 120. The core network is used to transfer the information between the two RNCs, i.e. between the source RNC 111 and the target RNC 112. The interface, which may be an IUR interface, is not used in the relocation procedure.

The UE 120 then switches from the old RRC configuration defined by the source RNC 111 to the new RRC configuration defined by the target RNC 112. This is a hard handover.

Figure 6:
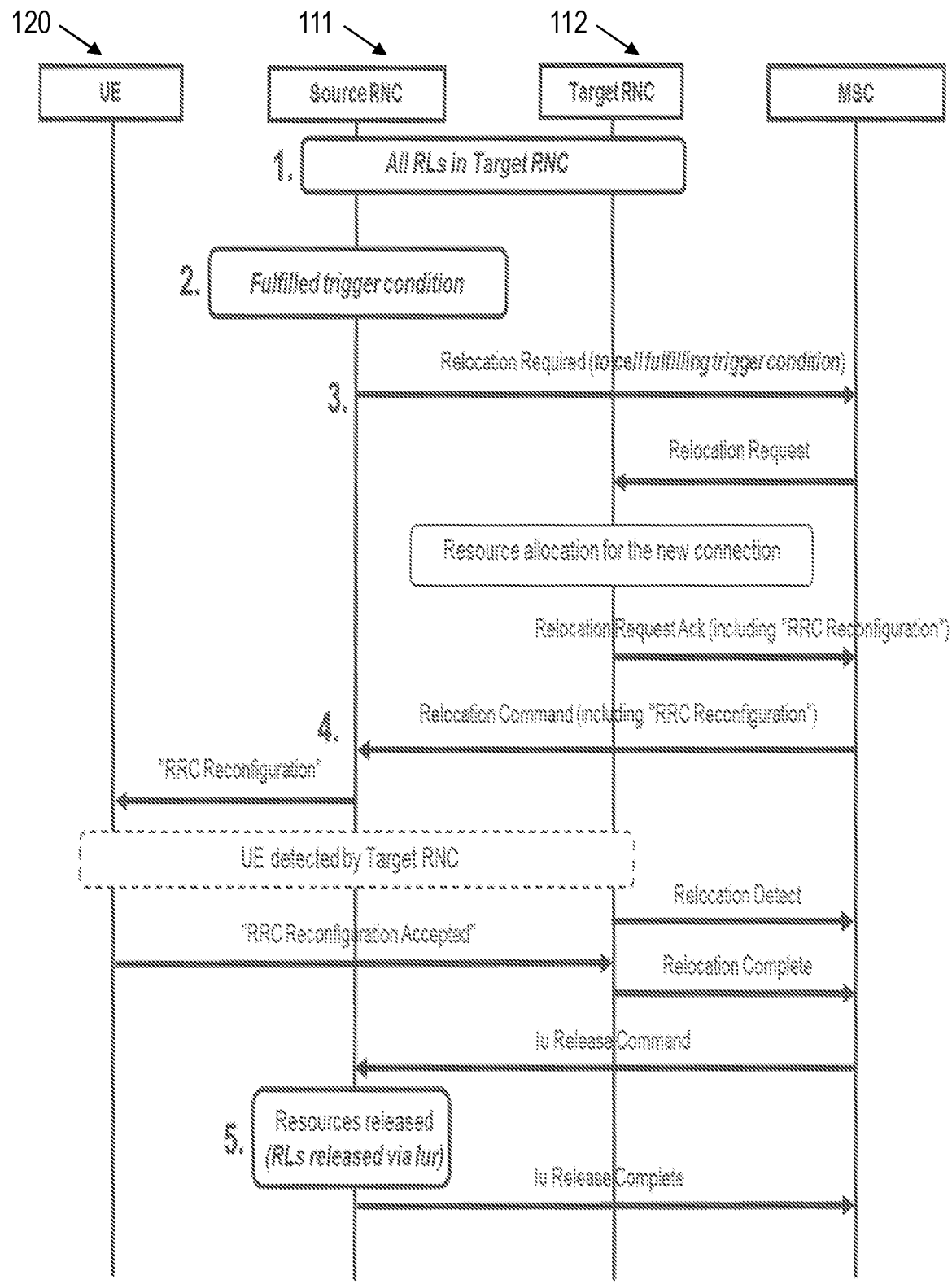
FIG. 6 is a signaling diagram illustrating embodiments herein.

A relocation procedure, according to embodiments herein, is shown in FIG. 6.

As described above the interface may be used for relocation of the UE 120 connection from the source RNC 111 to the target RNC 112 to serve the UE 120 in situations when the UE 120 is close to a border between the source RNC 111 and the target RNC 112. And, in situations when the interface between the source RNC 111 and the target RNC 112 is available, when all radio links in the ongoing wireless communication are controlled by the target RNC 112 and a triggering condition is fulfilled for relocation of the UE 120 connection from the source RNC 111 to the target RNC 112, the interface is discontinued and the relocation of the UE 120 connection from the source RNC 111 to the target RNC 112 to serve the UE 120 is performed using the core network 130.

The interface, such as an IUR interface, is available between the source RNC 111 and the target RNC 112 and the following steps are performed in the relocation procedure for handling a relocation of the UE 120 connection from the source RNC 111 to the target RNC 112 to serve the UE 120 in an ongoing wireless communication:

Step 1. Once all Radio Links (RLs) are controlled by the target RNC 112, that is, all RLs in the source RNC 111, i.e. the serving RNC are terminated, the source RNC 111 waits for the trigger condition to be fulfilled. The triggering condition may for example be the next measurement report with an event 1*a*, i.e. the cells that are served by the target RNC enter a reporting range to the UE 120.

Step 2. The trigger condition is fulfilled.

Step 3. The SRNS Relocation UE involved procedure is triggered by the source RNC 111 indicating the cell that fulfilled the trigger condition as a target cell. This may be performed by the source RNC 111 by sending a Relocation Required message to an Mobile Switching Center (MSC). The resource allocation for the new connection is achieved by the MSC then sending a Relocation Request message to the Target RNC 112 and the Target RNC sends a Relocation Request Ack message to the MSC, which includes an RRC configuration.

Step 4. The MSC sends a Relocation Command message to the Source RNC 111, including the RRC configuration. The UE 120 then receives a new RRC configuration from the source RNC 111. The content of the RRC configuration message is defined by the target RNC 112. The UE 120 is detected by the target RNC 112. The target RNC 112 sends a Relocation Detect message to the MSC and the UE 120 sends a RRC configuration Accepted message to the target RNC 112. The target RNC 112 then sends a Relocation Complete message to the MSC and the MSC sends an Iu Release Command message to the source RNC 111.

Step 5. Then once the relocation procedure is finished the old source RNC 111 resources are released. This means that the source RNC 111 will delete the RLs over the interface. An Iu Release Complete message is sent from the source RNC 111 to the MSC.

Figure 7:
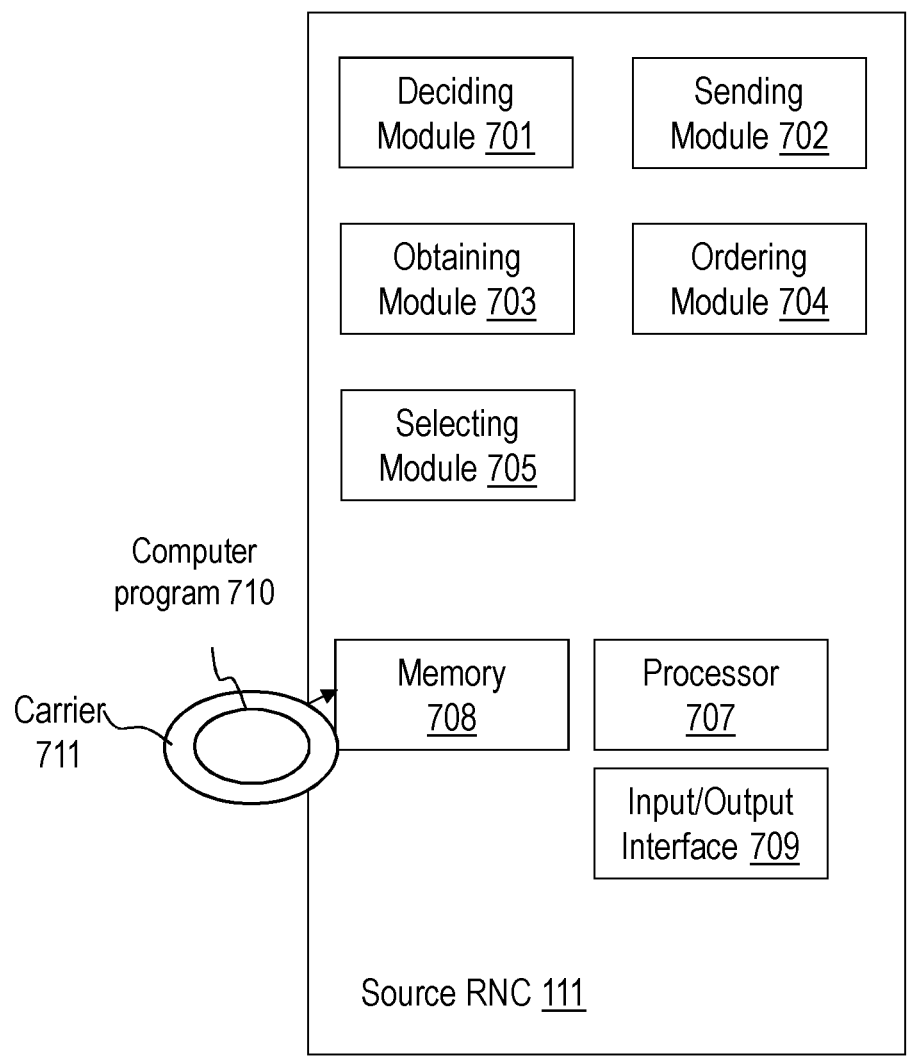
FIG. 7 is a schematic block diagram illustrating embodiments of a source RNC.

To perform the method actions above for handling a relocation of the UE 120 connection from the source RNC 111 to the target RNC 112 to serve a UE 120 in an ongoing wireless communication the source RNC 111 may comprise the arrangement depicted in FIG. 7. The source RNC 111 may e.g. comprise a deciding module 701, a sending module 702 an obtaining module 703, an ordering module 704 and a selecting module 705.

Those skilled in the art will also appreciate that the modules in the source RNC 111 described above may refer to a combination of analog and digital circuits, and/or one or more processors configured with software and/or firmware, e.g. stored in the source RNC 111, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The source RNC 111 may comprise an input and output interface 709 configured to communicate with e.g. the UE 120 and the target RNC 112. The input and output interface may comprise a wireless receiver (not shown) and a wireless transmitter (not shown).

The source RNC 111 is configured to, e.g. by means of the deciding module 701, decide to discontinue to use an interface, which is available between the source RNC 111 and the target RNC 112, when all radio links are controlled by the target RNC 112 and when a triggering condition is fulfilled for relocation of the UE 120 connection from the source RNC 111 to the target RNC 112.

The source RNC 111 is further configured to, e.g. by means of the sending module 702, use a core network 130 to send to the target RNC 112, a triggering of the relocation procedure for relocating the source RNC 111 to the target RNC 112 to serve the UE 120.

According to some embodiments, the source RNC 111 is further configured to, e.g. by means of the sending module 702, send the RRC configuration defined by the target RNC 112 to the UE 120, enabling the UE 120 to switch from an RRC configuration defined by the source RNC 111 to the RRC configuration defined by the target RNC 112.

The source RNC 111 is further configured to, e.g. by means of the obtaining module 703, obtain from the target RNC 112 via the core network 130, a Radio Resource Control, RRC, configuration adapted to be defined by the target RNC 112 to be used after the relocation to the target RNC 112.

The source RNC 111 is further configured to, e.g. by means of the ordering module 704, order the target RNC 112 to establish at least one radio link to be controlled by the target RNC 112 for the ongoing wireless communication, using the interface between the source RNC 111 and the target RNC 112, when it is adapted to be decided that the UE 120 is at a distance, from a border between the source RNC 111 and the target RNC 112, that is below a threshold value.

The source RNC 111 may further be configured to, e.g. by means of the selecting module 705, select a cell that fulfils the triggering condition, which cell is to be selected among cells that are served by the target RNC 112 and which selected cell is to be used as a target cell in the ongoing wireless communication after relocating to the target RNC 112.

According to some embodiments, the source RNC 111 is further configured to, e.g. by means of the selecting module 705, select a cell based on the triggering condition, and wherein the triggering condition is adapted to comprise a deletion of a last radio link in the serving RNC 111.

According to some embodiments, the source RNC 111 is further configured to e.g. by means of the selecting module 705, select a cell among cells that are served by the target RNC 112 and further, that are active for the UE 120.

The triggering condition may be adapted to comprise a deletion of a last radio link in the serving RNC 111 followed by a received measuring report from the UE 120 when the cells that are served by the target RNC enter a reporting range to the UE 120.

The relocation may be adapted to be an SRNS relocation.

The embodiments herein may be implemented through a respective processor or one or more processors, such as the processor 707 of a processing circuitry in the source RNC 111 depicted in FIG. 7, together with respective computer program code for performing the functions and actions of the embodiments herein. The program code mentioned above may also be provided as a computer program product, for instance in the form of a data carrier carrying computer program code for performing the embodiments herein when being loaded into the source RNC 111. One such carrier may be in the form of a CD ROM disc. It is however feasible with other data carriers such as a memory stick. The computer program code may furthermore be provided as pure program code on a server and downloaded to the source RNC 111.

The source RNC 111 may further comprise a memory 708 comprising one or more memory units. The memory 708 comprises instructions executable by the processor in the source RNC 111.

The memory 708 is arranged to be used to store e.g. data, configurations, and applications to perform the methods herein when being executed in the source RNC 111.

In some embodiments, a respective computer program 710 comprises instructions, which when executed by the respective at least one processor 707, cause the at least one processor of the source RNC 111 to perform the actions above.

In some embodiments, a respective carrier 711 comprises the respective computer program, wherein the carrier is one of an electronic signal, an optical signal, an electromagnetic signal, a magnetic signal, an electric signal, a radio signal, a microwave signal, or a computer-readable storage medium.

Figure 8:
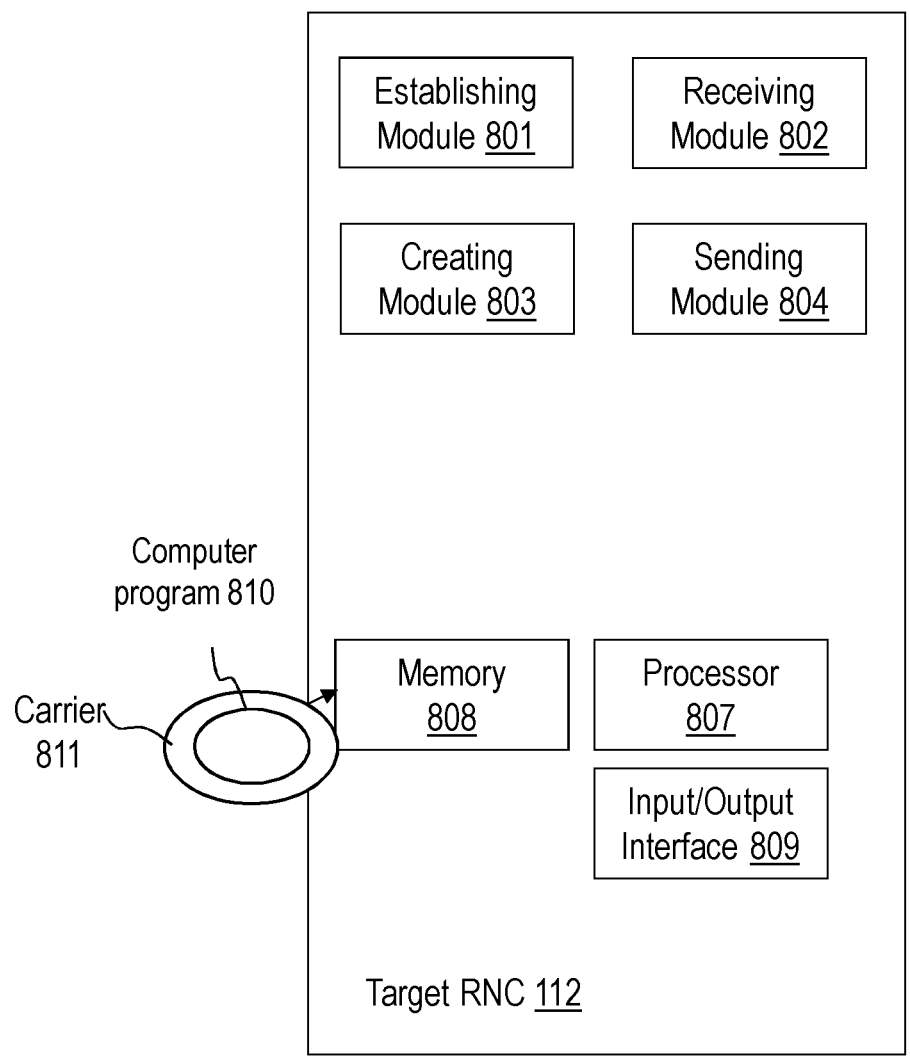
FIG. 8 is a schematic block diagram illustrating embodiments of a target RNC.

To perform the method actions above for handling a relocation of the UE 120 connection from the source RNC 111 to the target RNC 112 to serve a UE 120 in an ongoing wireless communication the target RNC 112 may comprise the arrangement depicted in FIG. 8. The target RNC 112 may e.g. comprise an establishing module 801, a receiving module 802 a creating module 803 and a sending module 804.

Those skilled in the art will also appreciate that the modules in the target RNC 112 described above may refer to a combination of analog and digital circuits, and/or one or more processors configured with software and/or firmware, e.g. stored in the target RNC 112, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The target RNC 112 may comprise an input and output interface 809 configured to communicate with e.g. the UE 120 and the source RNC 111. The input and output interface may comprise a wireless receiver (not shown) and a wireless transmitter (not shown).

The target RNC 112 is configured to, e.g. by means of the receiving module 802, when all radio links in the ongoing wireless communication are controlled by the target RNC 112 and when a triggering condition is fulfilled for relocation of the UE 120 connection from the source RNC 111 to the target RNC 112 and based on that the UE 120 is at a distance from a border between the source RNC 111 and the target RNC 112 which is below a threshold value, receive from the source RNC via the interface between the source RNC and the target RNC, an order to establish at least one radio link to be controlled by the target RNC for the ongoing wireless communication.

The target RNC 112 is configured to, e.g. by means of the establishing module 801, establish at least one radio link for the ongoing wireless communication, using an interface between the source RNC 111 and the target RNC 112 according to the order.

The target RNC 112 is configured to, e.g. by means of a creating module 803, create a Radio Resource Control, RRC, configuration to be used after the relocation to the target RNC 112.

The target RNC 112 is configured to, e.g. by means of a sending module 804, using a core network 130 to send the RRC configuration adapted to be defined by the target RNC 112 to the UE 120 via the source RNC 111, enabling the UE 120 to switch from an RRC configuration, adapted to be defined by the source RNC 111, to the RRC configuration adapted to be defined by the target RNC 112.

The relocation may be adapted to be an SRNS, relocation.

The embodiments herein may be implemented through a respective processor or one or more processors, such as the processor 807 of a processing circuitry in the target RNC 112 depicted in FIG. 8, together with respective computer program code for performing the functions and actions of the embodiments herein. The program code mentioned above may also be provided as a computer program product, for instance in the form of a data carrier carrying computer program code for performing the embodiments herein when being loaded into the target RNC 112. One such carrier may be in the form of a CD ROM disc. It is however feasible with other data carriers such as a memory stick. The computer program code may furthermore be provided as pure program code on a server and downloaded to the target RNC 112.

The target RNC 112 may further comprise a memory 808 comprising one or more memory units. The memory 808 comprises instructions executable by the processor in the target RNC 112.

The memory 808 is arranged to be used to store e.g. data, configurations, and applications to perform the methods herein when being executed in the target RNC 112.

In some embodiments, a respective computer program 810 comprises instructions, which when executed by the respective at least one processor 807, cause the at least one processor of the target RNC 112 to perform the actions above.

In some embodiments, a respective carrier 811 comprises the respective computer program, wherein the carrier is one of an electronic signal, an optical signal, an electromagnetic signal, a magnetic signal, an electric signal, a radio signal, a microwave signal, or a computer-readable storage medium.

FURTHER EXTENSIONS AND VARIATIONS

Figure 9:
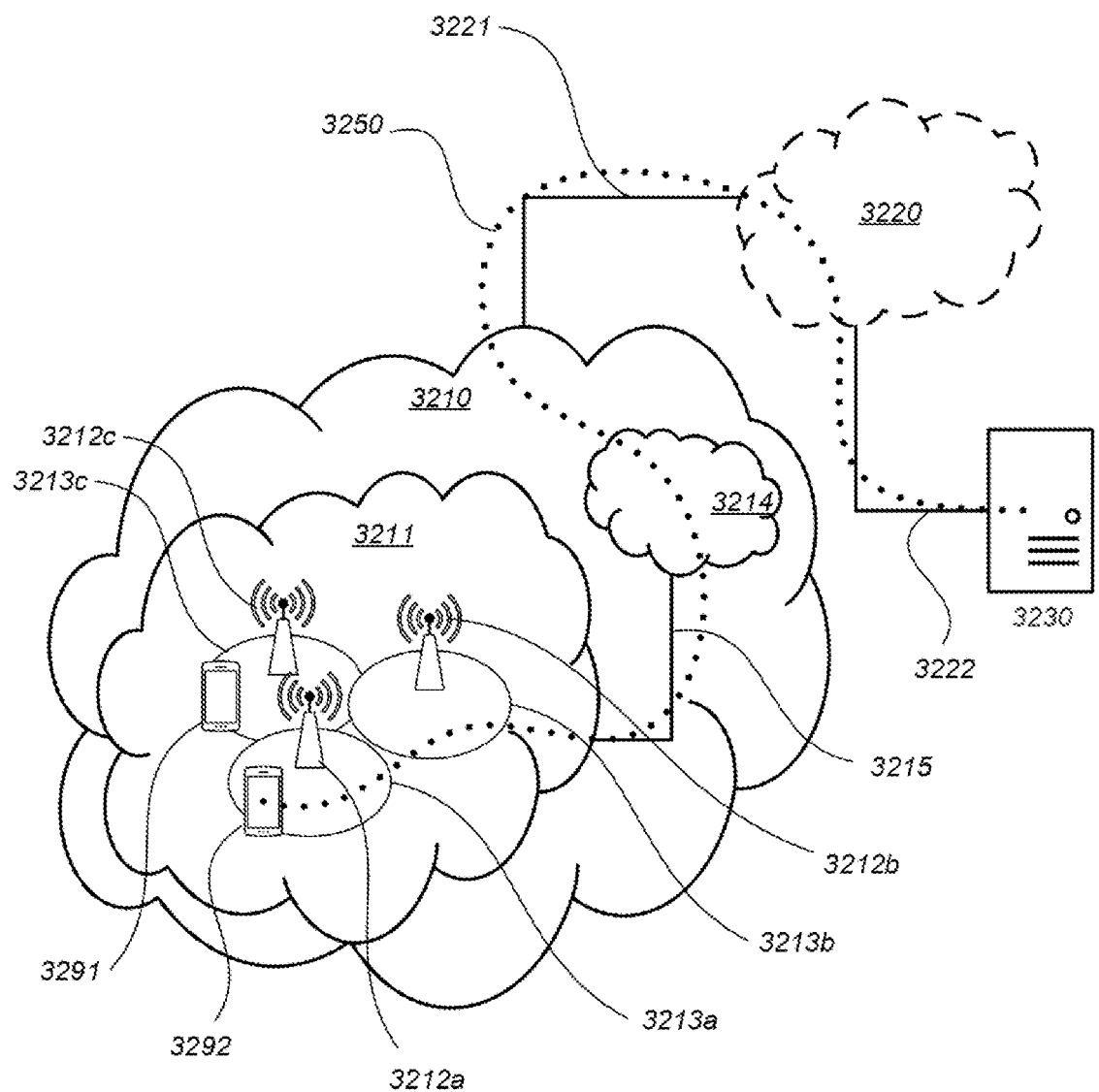
FIG. 9 schematically illustrates a telecommunication network connected via an intermediate network to a host computer.

With reference to FIG. 9, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212a, 3212b, 3212c, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE), e.g. the UE 120, such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 10:
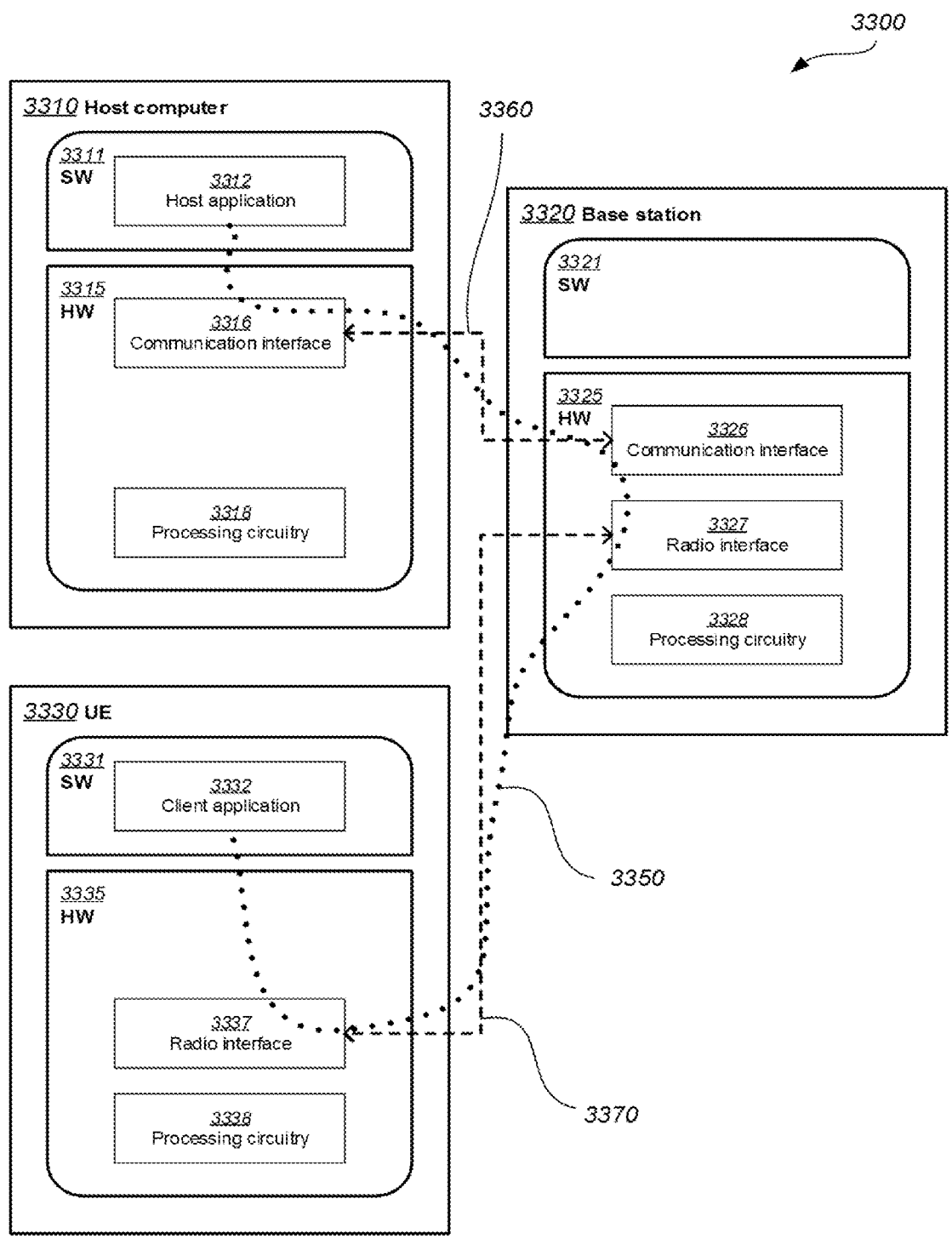
FIG. 10 is a generalized block diagram of a host computer communicating via a base station with a user equipment over a partially wireless connection.
Figures 11, 12:
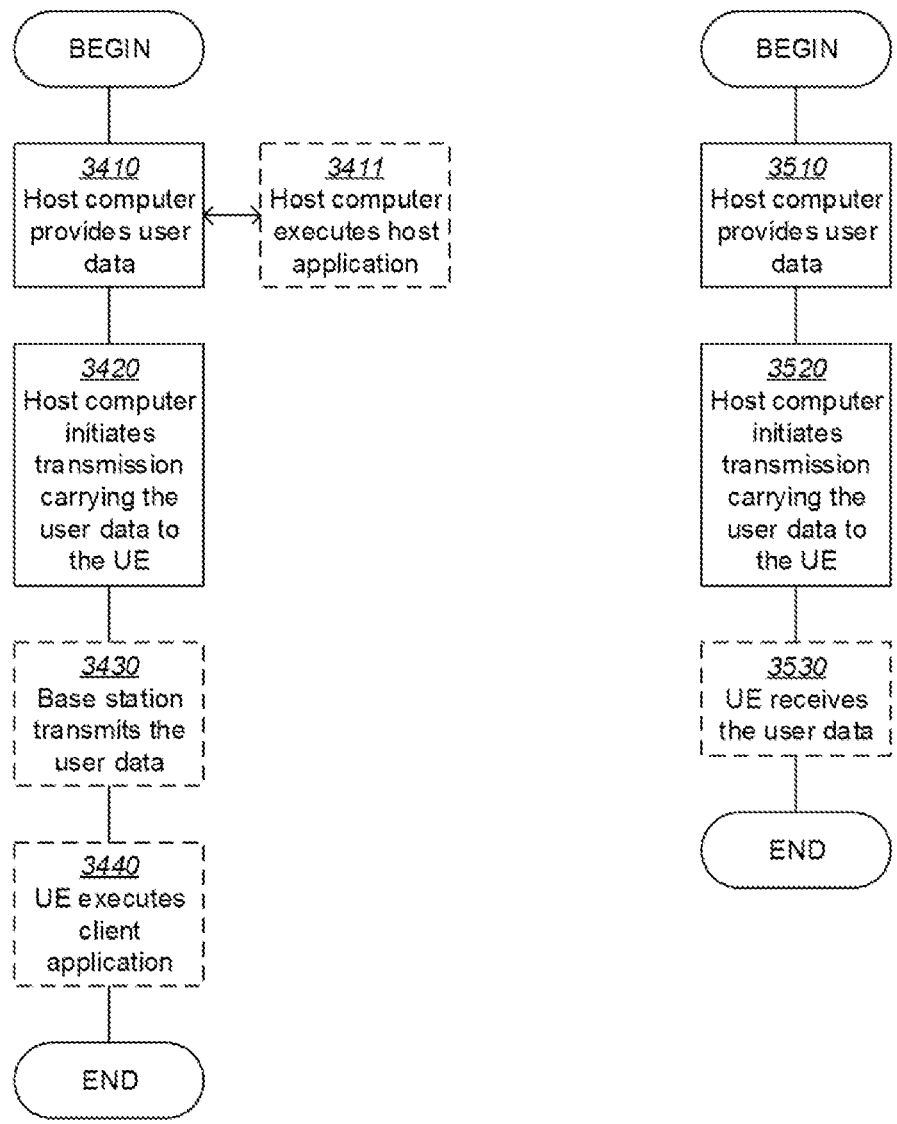

It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 11, respectively. This is to say, the inner workings of these entities may be as shown in FIG. 10 and independently, the surrounding network topology may be that of FIG. 9.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve.

There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 11 is a flowchart illustrating a method implemented in a communication system, in accordance with one embodiment. The communication system includes a host computer, a base station and a UE such as the UE 120, which may be those described with reference to FIG. 9 and FIG. 10. For simplicity of the present disclosure, only drawing references to FIG. 11 will be included in this section. In a first action 3410 of the method, the host computer provides user data. In an optional sub action 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 12 will be included in this section. In a first action 3510 of the method, the host computer provides user data. In an optional sub action (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 13 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 13 will be included in this section. In an optional first action 3610 of the method, the UE receives input data provided by the host computer. Additionally or alternatively, in an optional second action 3620, the UE provides user data. In an optional sub action 3621 of the second action 3620, the UE provides the user data by executing a client application. In a further optional sub action 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third sub action 3630, transmission of the user data to the host computer. In a fourth action 3640 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 14 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Abbreviation Explanation
CN Core Network
CS Circuit Switch
DCH Dedicated Channel
PS Packet Switch
RAB Radio Access Bearer
RL Radio Link
RNC Radio Network Controller
RNS Radio Network Subsystem
SRNS Serving RNS
UE User Equipment

The invention claimed is:

1. A method performed by a source Radio Network Controller (RNC) for handling a relocation of a User Equipment (UE) connection from the source RNC to a target RNC during an ongoing wireless communication, the method comprising:
when a distance between the UE and a border between the source RNC and the target RNC is below a threshold value, ordering the target RNC to establish at least one radio link to be controlled by the target RNC for the ongoing wireless communication, using an available interface between the source RNC and the target RNC;
when all radio links in the ongoing wireless communication are controlled by the target RNC and a triggering condition is fulfilled for relocation of the UE connection from the source RNC to the target RNC, deciding to discontinue use of the available interface between the source RNC and the target RNC;
sending, to the target RNC via a core network, a triggering of a relocation procedure for relocating the UE connection from the source RNC to the target RNC;
obtaining, from the target RNC via the core network, a Radio Resource Control (RRC) configuration defined by the target RNC to be used by the UE after relocation to the target RNC; and
sending the obtained RRC configuration to the UE, thereby enabling the UE to switch from an RRC configuration defined by the source RNC to the RRC configuration defined by the target RNC.

2. The method of claim 1, wherein the relocation procedure comprises selecting, from among cells that are served by the target RNC, a cell that fulfils the triggering condition to be used as a target cell in the ongoing wireless communication after relocating to the target RNC.

3. The method of claim 2, wherein the triggering condition comprises a deletion in the source RNC of a last radio link of the ongoing wireless communication followed by a received measuring report from the UE when the cells that are served by the target RNC enter a reporting range to the UE.

4. The method of claim 2, wherein the cell is selected from among cells that are served by the target RNC and that are active for the UE.

5. The method of claim 4, wherein the cell is selected based on the triggering condition, which comprises a deletion in the source RNC of a last radio link of the ongoing wireless communication.

6. The method of claim 1, wherein the relocation is a Serving Radio Network Subsystem (SRNS) relocation.

7. A non-transitory, computer-readable medium storing instructions that, when executed by a processor associated with a source radio network controller (RNC), cause the source RNC to perform operations corresponding to the method of claim 1.

8. A source Radio Network Controller (RNC) configured to handle relocation of a User Equipment (UE) connection from the source RNC to a target RNC during an ongoing wireless communication, wherein the source RNC comprises:
  one or more processors; and
  memory storing executable instructions that, when executed by the one or more processors, configure the source RNC to:
    when a distance between the UE and a border between the source RNC and the target RNC is below a threshold value, order the target RNC to establish at least one radio link to be controlled by the target RNC for the ongoing wireless communication, using an available interface between the source RNC and the target RNC;
    when all radio links in the ongoing wireless communication are controlled by the target RNC and a triggering condition is fulfilled for relocation of the UE connection from the source RNC to the target RNC, decide to discontinue use of the available interface between the source RNC and the target RNC;
    send, to the target RNC via a core network, a triggering of a relocation procedure for relocating the UE connection from the source RNC to the target RNC;
    obtain, from the target RNC via the core network, a Radio Resource Control (RRC) configuration defined by the target RNC to be used by the UE after relocation to the target RNC; and
    send the obtained RRC configuration to the UE, thereby enabling the UE to switch from an RRC configuration defined by the source RNC to the RRC configuration defined by the target RNC.

9. The source RNC of claim 8, wherein execution of the instructions configures the source RNC to perform the relocation procedure based on selecting, from among cells that are served by the target RNC, a cell that fulfils the triggering condition to be used as a target cell in the ongoing wireless communication after relocating to the target RNC.

10. The source RNC of claim 9, wherein the triggering condition comprises a deletion in the source RNC of a last radio link of the ongoing wireless communication followed by a received measuring report from the UE when the cells that are served by the target RNC enter a reporting range to the UE.

11. The source RNC of claim 9, wherein the cell is selected from among cells that are served by the target RNC and that are active for the UE.

12. The source RNC of claim 11, wherein execution of the instructions further configures the source RNC to select the cell based on the triggering condition, which comprises a deletion in the source RNC of a last radio link of the ongoing wireless communication.

13. The source RNC of claim 8, wherein the relocation is a Serving Radio Network Subsystem (SRNS) relocation.

\* \* \* \* \*